US010404638B2

(12) United States Patent
Back

(10) Patent No.: US 10,404,638 B2
(45) Date of Patent: Sep. 3, 2019

(54) CONTENT SHARING SCHEME

(71) Applicant: KT Corporation, Seongnam-si, Gyeonggi-do (KR)

(72) Inventor: Soong-joo Back, Seoul (KR)

(73) Assignee: KT CORPORATION, Seongnam-Si, Gyeonggi-Do (KR)

(*) Notice: Subject to any disclaimer, the term of this patent is extended or adjusted under 35 U.S.C. 154(b) by 251 days.

(21) Appl. No.: 14/571,838

(22) Filed: Dec. 16, 2014

(65) Prior Publication Data

US 2015/0172240 A1 Jun. 18, 2015

(30) Foreign Application Priority Data

Dec. 18, 2013 (KR) .......................... 10-2013-0158108

(51) Int. Cl.
H04L 12/58 (2006.01)
G06F 16/951 (2019.01)

(52) U.S. Cl.
CPC ............ H04L 51/10 (2013.01); G06F 16/951 (2019.01); H04L 51/02 (2013.01); H04L 51/04 (2013.01)

(58) Field of Classification Search
None
See application file for complete search history.

(56) References Cited

U.S. PATENT DOCUMENTS 6,308,176 B1 * 10/2001 Bagshaw .......... G06F 17/30705
707/690
6,775,663 B1 8/2004 Kim

FOREIGN PATENT DOCUMENTS

| KR | 1020080030796 A | 4/2008 |
| KR | 1020090027017 A | 3/2009 |
| KR | 1020100029384 A | 3/2010 |
| KR | 10-2010-0060498 A | 6/2010 |
| KR | 10-2010-0065478 A | 6/2010 |
| KR | 10-2011-0090471 A | 8/2011 |
| KR | 10-1121018 B1 | 3/2012 |

OTHER PUBLICATIONS

Successful Searching in Dialog Jul. 1998, The Dialog Corporation, pp. 1-5, 8-13, 204-10.*
Crane et al., Introduction to Dialog: Featuring DialogWeb 2003, The Dialog Corporation, 110 pages.*
Darkbox, the IRC Talking Robot Jul. 1, 2002, sourceforge.net, /index.html, /examples.html.*
mIRC Versions Sep. 18, 2017, mirc.com, https://www.mirc.com/versions.txt.*

(Continued)

Primary Examiner — Jason G Liao
(74) Attorney, Agent, or Firm — Hamre, Schumann, Mueller & Larson, P.C.

(57) ABSTRACT

In one example embodiment, a method executed by a messenger application to share content information, includes displaying a message input window and a message display window; receiving, through the message input window, a content search command and a content keyword; selecting a content server based on the content search command; transmitting the content keyword to the selected content server; receiving content information from the selected content server; and displaying the received content information in the message display window.

11 Claims, 9 Drawing Sheets

(56) References Cited

OTHER PUBLICATIONS

IRC FAQ: Introduction to IRC for people using Windows date unknown [capture by archive.org on Nov. 23, 2012], https://web.archive.org/web/20121123005543/https://www.mirc.com/ircintro.html.*

Kassel, The New Prolog What's Dialog and Next? Feb. 2011, infotoday.com, http://www.infotoday.com/searcher/jan11/Kassel-The-New-Proquest-Dialog.pdf.*

Ojala, ProQuest Gives dialog a Makeover Jul. 23, 2013, Information Today, http://newsbreaks.infotoday.com/NewsBreaks/ProQuest-Gives-Dialog-a-Makeover-90918.asp.*

About mIRC, 2012 [captured by archive.org on Nov. 16, 2012], mirc.com, https://web.archive.org/web/20121116041610/http://www.mirc.com:80/about.html.*

* cited by examiner

| CONTENT SEARCH COMMAND | | | SEPARATOR | KEYWORD | NUMBER OF SEARCH RESULT | SEPARATOR | SEQUENCE |
|---|---|---|---|---|---|---|---|
| CONTENT SERVER | FIELD OF SEARCH | CONTENT TYPE | . | SHOES | 2 | . | POPULARITY |
| A (AMAZON) | S (SHOPPING) | I (IMAGE) | | | | | |

CONTENT SHARING SCHEME

TECHNICAL FIELD

The embodiments described herein pertain generally to a content sharing scheme.

BACKGROUND

IMS (Instant Message Service) refers to a real-time communication service by which a message sent from a transmitting device is immediately displayed in a display window of a receiving device. IMS conversations may include recommendations of various online content such as music, video files, or web pages. However, IMS is not conducive to actually sharing contents of an application or a web page

SUMMARY

In one example embodiment, a method executed to share content information may include: displaying at least one of a message input window or a message display window; receiving, through the message input window, at least one of a content search command or a content keyword; selecting a content server based on the content search command; transmitting the content keyword to the selected content server; receiving content information from the selected content server; and displaying the received content information in the message display window.

In another example embodiment, a computing device to execute a messenger application may include: a memory; and a processing unit configured to display at least one of a message input window or a message display window, to receive, through the message input window, at least one of a content search command or a content keyword, to select a content server, based on the content search command, to transmit the content keyword to the selected content server, to receive content information from the selected content server, and to display the received content information in the message display window.

In yet another example embodiment, a computer-readable storage medium having thereon computer-executable instructions that, in response to execution, cause a device to perform operations may include: displaying at least one of a message input window or a message display window; receiving, through the message input window, at least one of a content search command or a content keyword; selecting a content server, based on the content search command; transmitting the content keyword to the selected content server; receiving content information from the selected content server; and displaying the received content information in the message display window.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

FIG. 7 shows an example table for a content sharing scheme, in accordance with various embodiments described herein;

DETAILED DESCRIPTION

Figure 1:
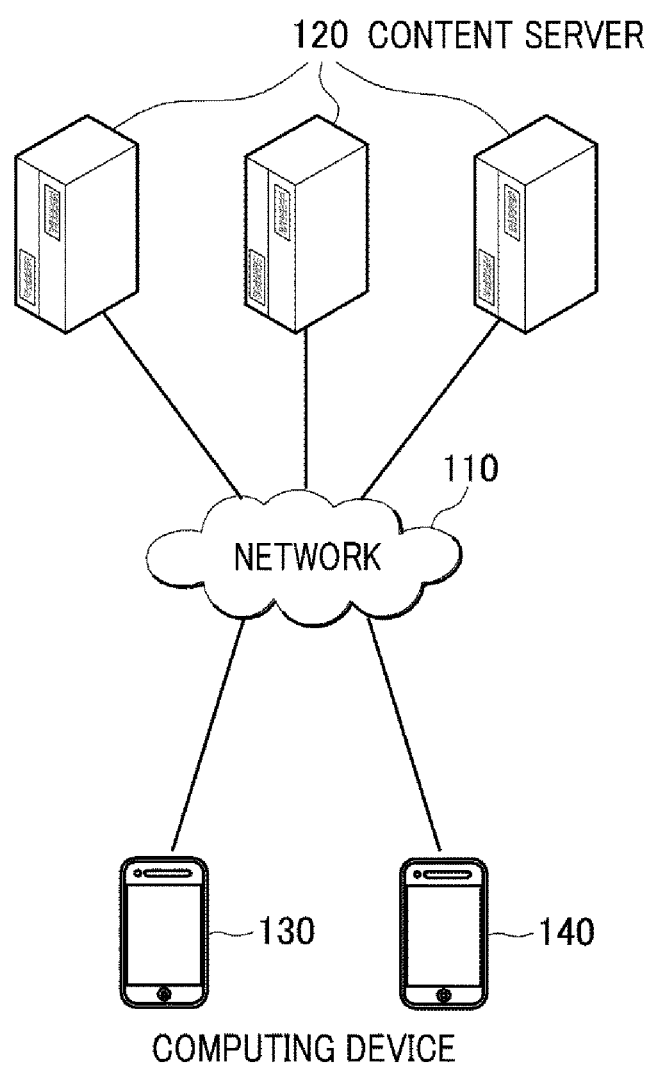
FIG. 1 shows an example system in which one or more embodiments of a content sharing scheme may be implemented, in accordance with various embodiments described herein.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

FIG. 1 shows an example system 10 in which one or more embodiments of a content sharing scheme may be implemented, in accordance with various embodiments described herein. As depicted in FIG. 1, system configuration 10 may include, at least, a plurality of content servers 120, and computing devices 130 and 140. Content servers 120 and computing devices 130 and 140 may be communicatively connected to each other via a network 110.

Computing devices 130 and 140 may include, for example, but not as a limitation, an IPTV (Internet Protocol Television), a Smart TV (Smart TV), a Connected TV, a notebook computer, a personal computer, a smart phone, a digital camera, a remote controller, a tablet computer, a phablet device, or a personal communication terminal, such as PCS (Personal Communication System), GMS (Global System for Mobile communications), PDC (Personal Digital Cellular), PDA (Personal Digital Assistant), IMT (International Mobile Telecommunication)-2000, CDMA (Code Division Multiple Access)-2000, W-CDMA (W-Code Division Multiple Access) and Wibro (Wireless Broadband Internet) terminal.

Network 110 may be a wired or wireless information or telecommunications network. Non-limiting examples of network 110 may include a wired network such as a LAN (Local Area Network), a WAN (Wide Area Network), a VAN (Value Added Network) or the like. Other non-limiting examples of network 110 may include wireless networks such as a mobile radio communication network, including at least one of a 3rd, 4th, or 5th generation mobile telecommunications network (3G), (4G), or (5G); various other mobile telecommunications networks; a satellite network; WiBro (Wireless Broadband Internet); Mobile WiMAX (Worldwide Interoperability for Microwave Access); HSDPA (High Speed Downlink Packet Access) or the like.

As referenced herein, an instant messaging application (herein referred to as "messenger application") may be regarded as a mobile instant messaging application hosted and operable on both computing device 130 and computing device 140 to share content transmitted from the corresponding content server by inputting a command in the messenger application window.

Instant messaging (IM) is a type of online chat that offers real-time text transmission over an IP network or other telecommunications networks. For example, short messages may be typically transmitted bi-directionally between two computing devices 130 and 140, as a user of one of the respective computing devices enters a message and activates a "send" function. On the other hand, some messenger applications may use push technology to provide real-time text, which transmits messages character by character, as they are composed.

To display, on the messenger application interface, real-time content including text, images, etc. received from one of content servers 120, the messenger application may display a message input window and/or a message display window on the messenger application interface of computing device 130 and 140. Further, the message input widow and the message display window may be included in the same messenger application interface window. For example, the message input window may be located below, beside, or above the message display window on each messenger application interface window.

After the messenger application displays a message input window and a message display window on the messenger application interface, the messenger application may be configured to receive, through the message input window, a content search command and/or a content keyword. The received content search command may be parsed by the respective one of computing device 130 or computing device 140 that receives the content search command. Then, the messenger application may identify an API corresponding to the parsed content search command based on predefined API table storing APIs corresponding to each content search command, so as to request content matching with the identified API to the corresponding content server.

Upon receipt of the content search command and/or the content keyword, the messenger application may be configured to prompt a processor to select at least one of content servers 120 identified by the content search command. That is, the content search command may include an identifier of one or more of content servers 120. After parsing the identifier, the messenger application may select a content server based on the parsed identifier. The identifiers may come in various forms and formats. Non-limiting examples of the identifier may include an alphanumeric identifier that corresponds to the first letter in the name of a content server host, e.g., "A" for "Amazon®;" or "E" for "E-bay®;" "N1" for "Nike®," or "N2" for "New Balance," etc. Thus, in accordance with a non-limiting example, if a content search command includes identifier "A", the messenger application may receive the search command as an instruction to search the "Amazon®" server.

Also, the content search command may include an identifier of a type of content subject matter to be searched. As a non-limiting example of the type of content subject matter, the type of content subject matter may include a text file, an image file, a video file, an audio file, a URL, etc. That is, as an example of the content search command and content keyword, the content search command plus a content keyword may include the following in various permutations of order: a content search command, preset separator, content keyword, preset separator, a count of search result, preset separator, and displayed sequence of the search result. The content search command and the content keyword may be separated by a preset separator such as period "." Further, search field indicators included in the content search command may come in various forms and formats. Non-limiting examples of the indicator may include an alphanumeric identifier that corresponds to the first letter in the name of a section of a website, e.g., "S" for "Shopping", "B" for "blog URL", "W" for "Webpage", etc.

After the messenger application causes a processor to parse the content search command and the content keyword received through the message input window and to select a content server matching with the parsed content search command among content servers 120, the messenger application may cause a processor to transmit, to the selected content server, an API corresponding to the parsed content search command and the parsed content keyword.

After the messenger application causes a processor to transmit such a request to the selected content server by calling the corresponding API, the messenger application may cause a processor to receive content information from the selected content server and display the received content information in the message display window of either of computing device 130 and computing device 140.

For example, the messenger application may cause a processor to receive and display an image of a desired product that may be uploaded and displayed in the "shopping" section of Amazon.com. That is, the messenger application may cause a processor to receive the image of the desired product by receiving a corresponding content search command and keyword in the message input window, without going through a process of "clicking and dragging" or "copying and pasting" the product image uploaded and displayed in the "shopping" section of Amazon.com.

In addition, the messenger application may cause a processor to receive the content search command including the specific number of search results and/or a description of a sequence of the content information to be displayed in the message display window. As an example of default configuration, if the messenger application receives a user input such as "content search command.content keyword" through the message input window, because the specific number of search results regarding content information to be displayed has not been input to the messenger application, the messenger application may cause a processor to display an image of the desired product in the message display window as default display condition.

In addition, if the messenger application causes a processor to receive a user input such as "content search command.content keyword.the number of contents," because the user input includes a command that two results are to be displayed, the messenger application may request two images of the desired product from the Amazon® server by calling an API associated with the identifier of the selected content server. After the messenger application receives the two images transmitted from Amazon® server, the messenger application may display the two images of "New Balance® 990" in the message display window.

The messenger application may cause a processor to display the aforementioned two images that have been rearranged in accordance with additional conditions: a sequence of popularity or recently uploaded, if the messenger application receives a user input such as "content search command.content keyword.the number of contents.the sequence of display." When the messenger application causes a processor to request two images from an Amazon.com® server, the messenger application may also receive metadata attached to the two images including a time of image upload, and the number of mouse clicks by viewers on the image, etc. Based on the metadata of the received images, the messenger application may cause a processor to rearrange the received images.

Thus, FIG. 1 shows example system 10 in which one or more embodiments of a content sharing scheme may be implemented, in accordance with various embodiments described herein.

Figure 2:
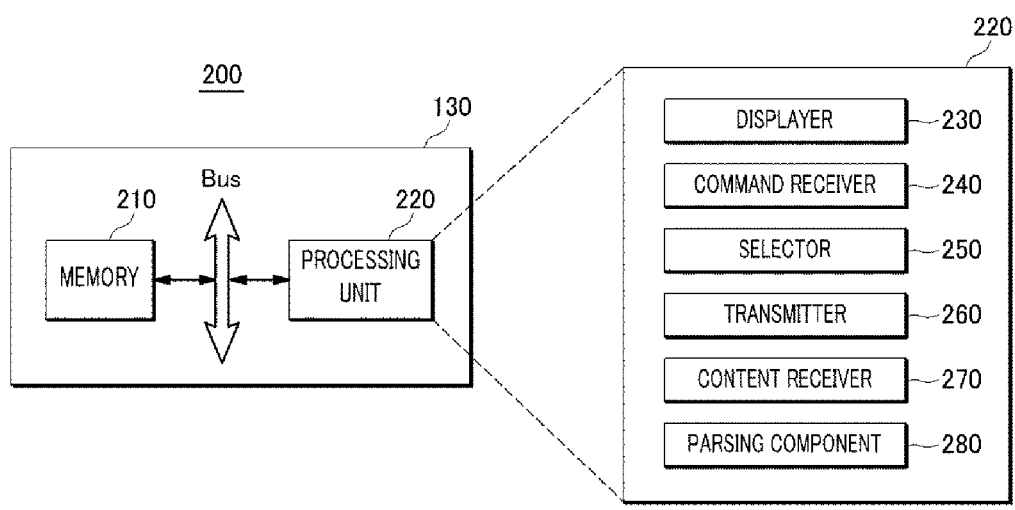
FIG. 2 shows an example device in which at least portions of a content sharing scheme may be implemented, in accordance with various embodiments described herein.

FIG. 2 shows an example device 200 in which at least portions of a content sharing scheme may be implemented, in accordance with various embodiments described herein. For example, as depicted in FIG. 2, computing device 130 may include memory 210 and processing unit 220. Processing unit 220 may include a displayer 230 configured to display a message input window and a message display window, and display the received content information in the message display window, a command receiver 240 configured to receive, through the message input window, a content search command and a content keyword, a selector 250 configured to select a content server, based on the content search command, a transmitter 260 configured to transmit the content keyword to the selected content server, a content receiver 270 configured to receive content information from the selected content server, and a parsing component 280 configured to parse the content search command and the content keyword in accordance with the preset separator.

Displayer 230 may display a message input window and/or a message display window on the messenger application interface of computing device 130 and 140. Further, the message input widow and the message display window may be included in the same messenger application interface window. In addition, displayer 230 may display the received content information from the content servers 120 including one or more images, etc. in the message display window.

Command receiver 240 may receive, through the message input window, a content search command and/or a content keyword. The content search command plus a content keyword may include the following in various permutations of order: content search command, preset separator, content keyword, preset separator, a count of search result, preset separator, and displayed sequence of the search result. The content search command may include an identifier of the selected content server 120. The identifier of the selected content server 120 may be associated with application programming interface (API) provided by the selected content server 120.

In addition, the content search command may include an identifier of a field of search in addition to the identifier of content server 120. Further, the content search command may include an identifier of a type of content subject matter to be searched. For example, the type of content subject matter may include at least one of a text file, an image file, a video file, an audio file, a URL, song lyrics, and a map. The preset separators may include special characters, e.g., a period (.), a comma (,), an exclamation mark (!), a question mark (?), a space ( ), etc.

The content search command may further include the number of search results to be displayed in the message display window and/or a description of the sequence of the content information. The description of the sequence of the content information may indicate a sequence in which the received search results are displayed. The sequence may be determined in accordance with popularity of the content information with other users.

Selector 250 may select at least one of content servers 120 identified by the content search command. That is, the content search command may include an identifier to indicate one or more of content servers 120. After analyzing the identifier, selector 250 may select a content server based on the analyzed identifier. Transmitter 260 may transmit, to the selected content server, an API corresponding to the parsed content search command and the parsed content keyword. Content receiver 270 may receive the content information from content server 120 by calling an API associated with the identifier of the selected content server. Parsing component 280 may parse the received content search command and content keyword through command receiver 240. Then, parsing component 280 may identify an API corresponding to the parsed content search command and content keyword based on predefined API table storing APIs corresponding to each content search command, so as to request content matching with the identified API to the corresponding content server.

Thus, FIG. 2 shows example device 200 in which one or more embodiments of a content sharing scheme may be implemented, in accordance with various embodiments described herein.

Figure 3:
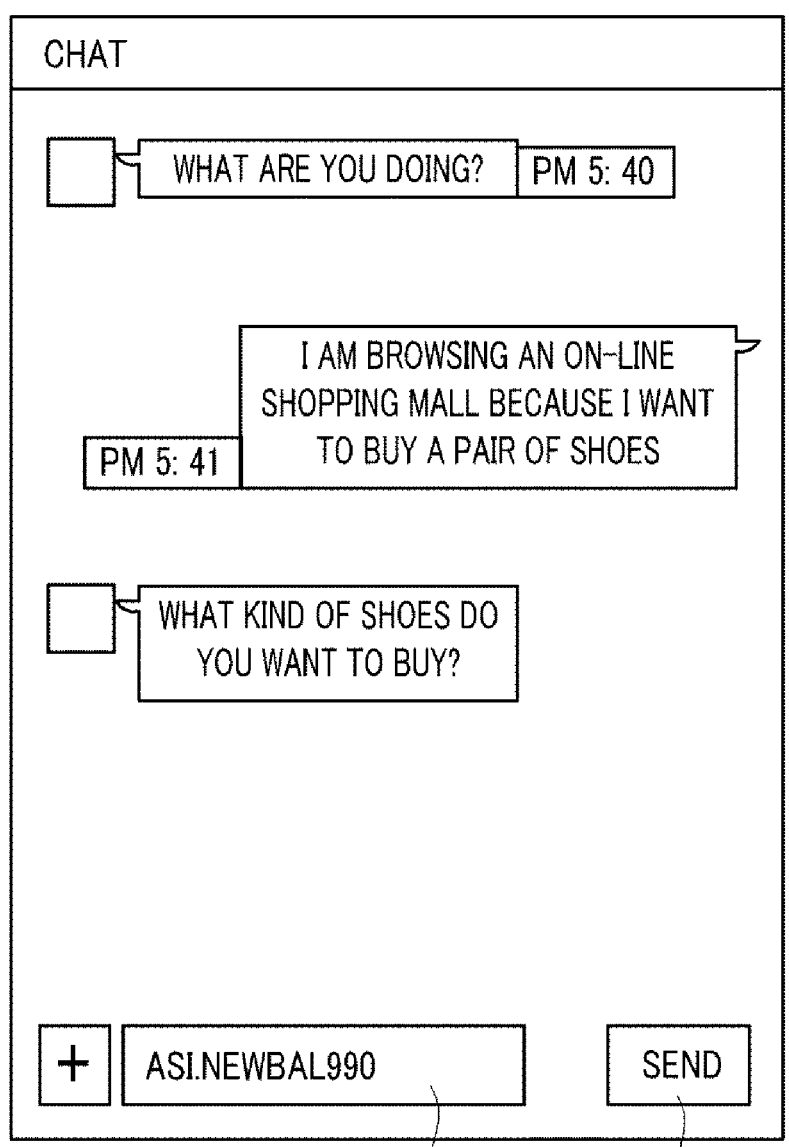
FIG. 3 shows an example user interface by which at least portions of a content sharing scheme may be implemented, in accordance with various embodiments described herein.

FIG. 3 shows an example user interface 300 by which at least portions of a content sharing scheme may be implemented, in accordance with various embodiments described herein. FIG. 3 depicts a text conversation between respective users of computing devices 130 and 140 displayed in the respective message display windows 330, along with a content search command and a content keyword entered in the message input window 310.

In FIG. 3, the messenger application may cause a processor to receive a user input including the content search command and content keyword through the message input window 310. Then, the messenger application may cause a processor to receive a user input to activate a "send" function 320. After that, the messenger application may cause a processor to identify an API corresponding to the parsed content command and content keyword to request content from a content server associated with the API.

The content search command and the content keyword may be separated by a preset separator such as "period (.)" Further, search field indicators included in the content search command may come in various forms and formats. Non-limiting examples of the indicator may include an alphanumeric identifier that corresponds to the first letter in the name of a section of a website, e.g., "S" for "Shopping", "B" for "blog URL", "W" for "Webpage", etc.

Thus, FIG. 3 shows an example user interface 300 by which at least portions of a content sharing scheme may be implemented, in accordance with various embodiments described herein.

Figure 4:
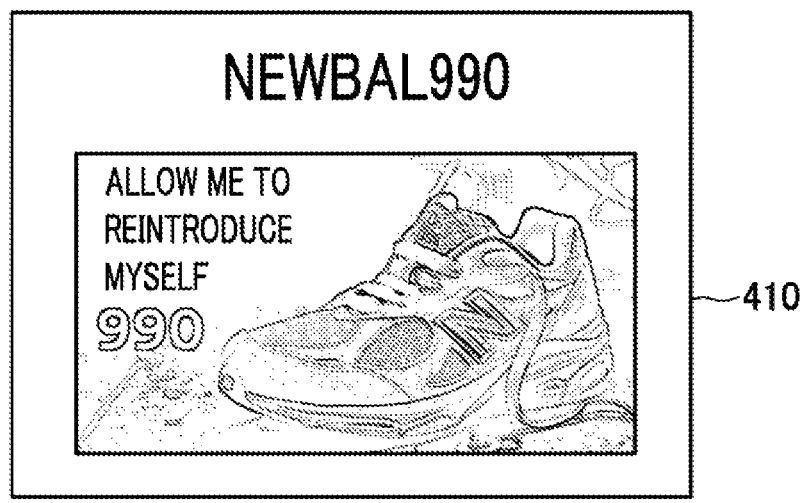
FIG. 4 shows an example image to be displayed on a user interface, in accordance with various embodiments described herein.

FIG. 4 shows an example image to be displayed on a user interface, in accordance with various embodiments described herein. FIG. 4 depicts an example image 410 to be displayed in the message display window. When the messenger application receives no search results, the messenger application may cause a processor to display past search results.

Thus, FIG. 4 shows an example image to be displayed on a user interface, in accordance with various embodiments described herein.

Figure 5:
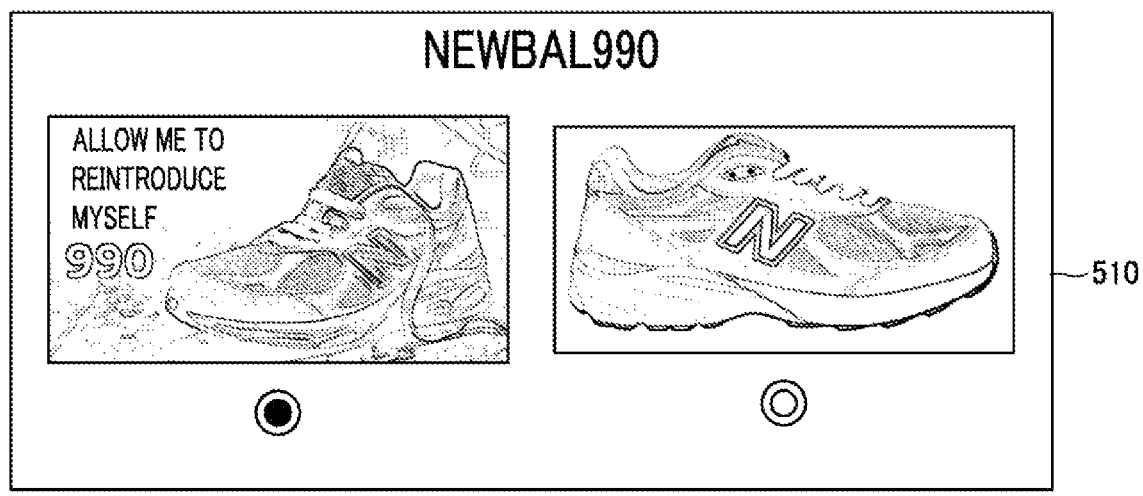
FIG. 5 shows an example image to be displayed on a user interface, in accordance with various embodiments described herein.

FIG. 5 shows an example image to be displayed on a user interface, in accordance with various embodiments described herein. FIG. 5 depicts an example image 510 to be displayed in the message display window, in case that the messenger application may cause a processor to receive a user input regarding the number of search results to be shown.

For example, if the messenger application causes a processor to receive a user input such as "content search command.content keyword.the number of contents" in the message input window, the messenger application may cause a processor to display two images of the desired product 510 transmitted from one of content server 120 in a pop-up window. In the pop-up window, the messenger application may cause a processor to receive a user input to select an image between the two images 510. Based on the selection input, the messenger application may cause a processor to display only the selected image in the message display window.

Thus, FIG. 5 shows an example image to be displayed on a user interface, in accordance with various embodiments described herein.

Figure 6:
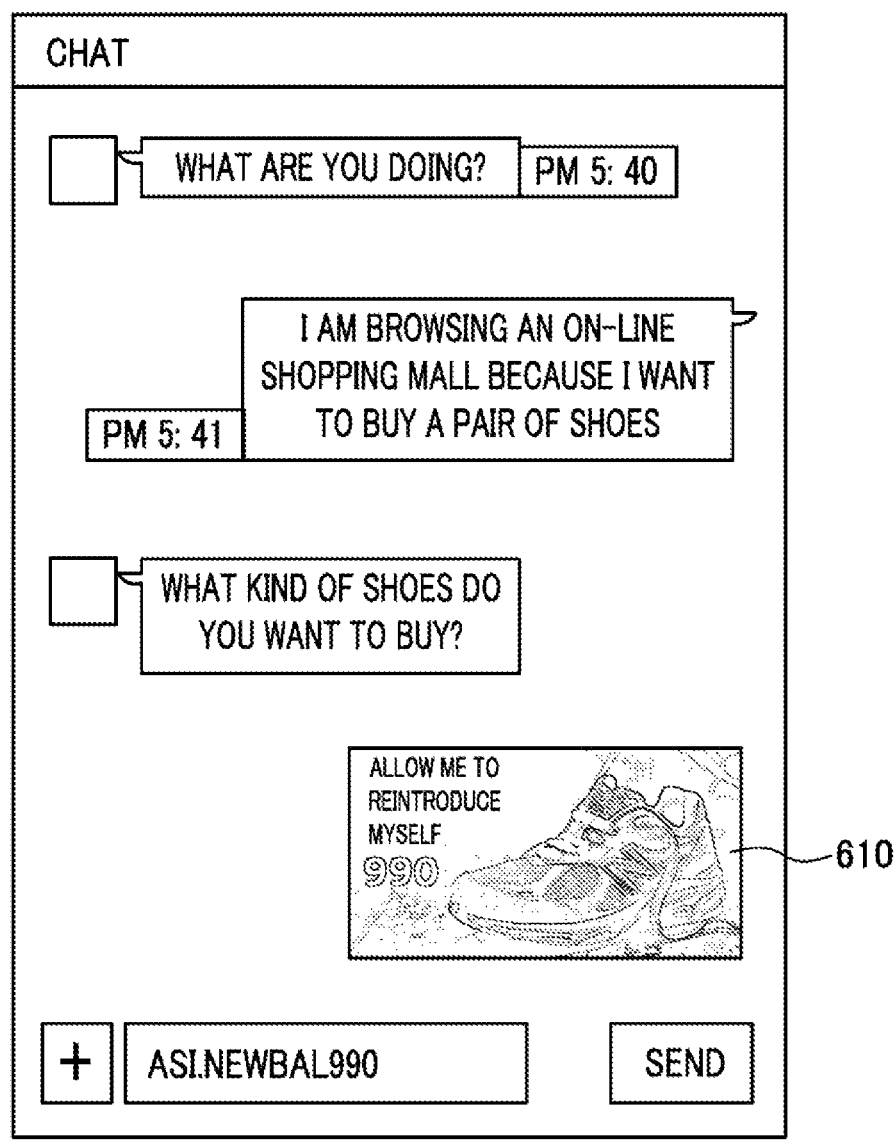
FIG. 6 shows an example user interface by which at least portions of a content sharing scheme may be implemented, in accordance with various embodiments described herein.

FIG. 6 shows an example user interface 600 by which at least portions of a content sharing scheme may be implemented, in accordance with various embodiments described herein. FIG. 6 depicts an example image 610 along with a text exchange between users of respective computing devices 130 and 140 in the message display window. The image 610 may correspond to either an image as a default setting or a user-selected one between two images received from content server 120.

Thus, FIG. 6 shows an example user interface 600 by which at least portions of a content sharing scheme may be implemented, in accordance with various embodiments described herein.

FIG. 7 shows an example table 700 for a content sharing scheme, in accordance with various embodiments described herein. FIG. 7 depicts an example of content search command, separator, content keyword, the number of search result, separator, and a description of a sequence of search result. For example, the content search command plus a content keyword may include the following in various permutations of order: content search command, preset separator, content keyword, preset separator, a count of search result, preset separator, and displayed sequence of the search result. The content search command and the content keyword may be separated by a preset separator such as "period (.)"

Further, the content search command may include an identifier of one or more of content servers 120. The identifiers may come in various forms and formats. Non-limiting examples of the identifier may include an alphanumeric identifier that corresponds to the first letter in the name of a content server host, e.g., "A" for "Amazon®;" or "E" for "E-bay®;" "N1" for "Nike®," or "N2" for "New Balance," etc. Thus, if a content search command includes identifier "A", the messenger application may cause a processor to receive the search command as an instruction to search the "Amazon®" server.

In addition, search field indicators included in the content search command may come in various forms and formats. Non-limiting examples of the indicator may include an alphanumeric identifier that corresponds to the first letter in the name of a section of a website, e.g., "S" for "Shopping", "B" for "Blog URL", "W" for "Webpage", etc. Also, the content search command may include an identifier of a type of content subject matter to be searched. As a non-limiting example of the type of content subject matter, the type of content subject matter may include a text file, an image file, a video file, an audio file, a URL, etc.

Thus, FIG. 7 shows an example table 700 for a content sharing scheme, in accordance with various embodiments described herein.

Figure 8:
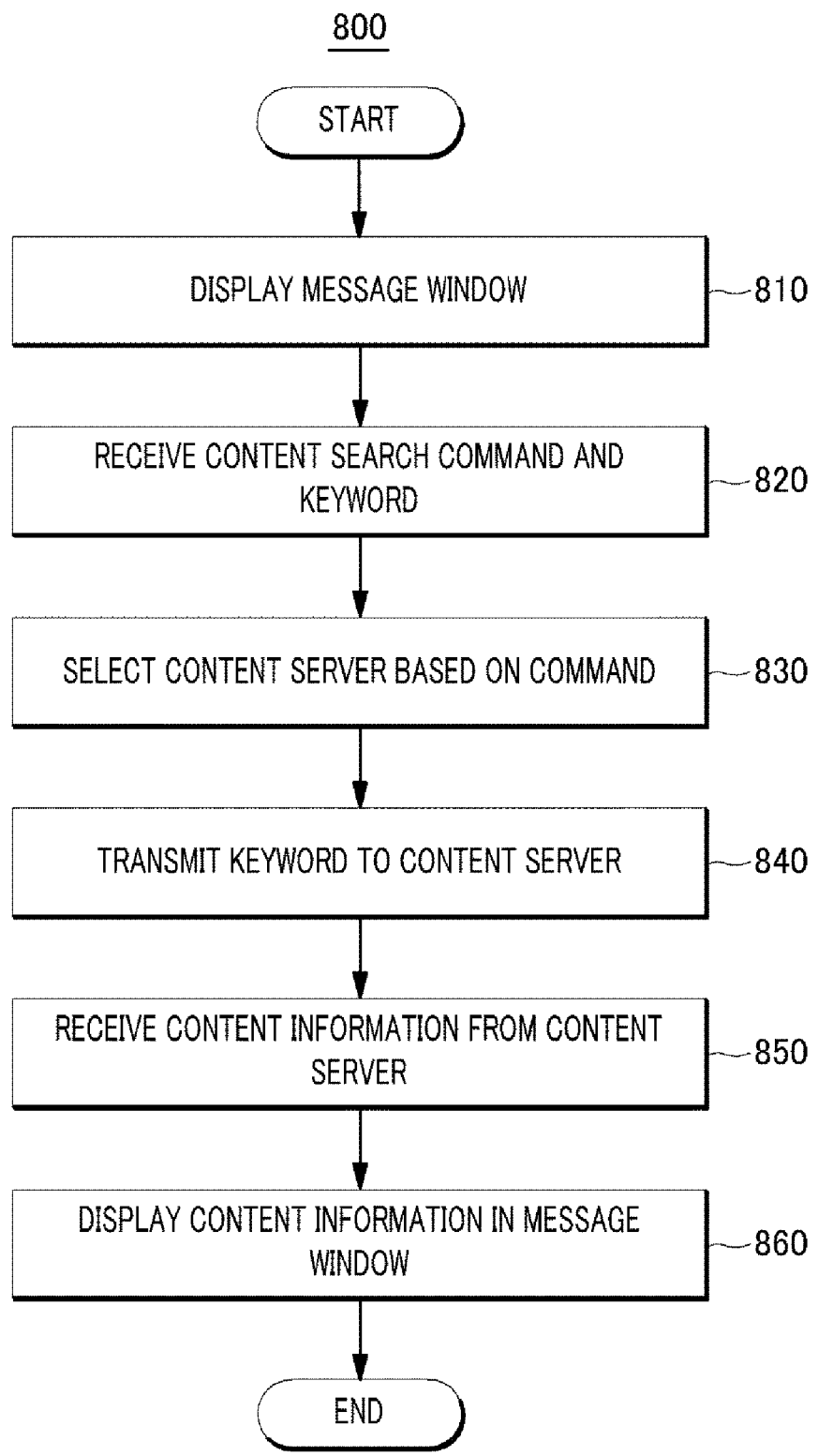
FIG. 8 shows an example processing flow of operations by which at least portions of a content sharing scheme may be implemented, in accordance with various embodiments described herein.

FIG. 8 shows an example processing flow 800 of operations by which at least portions of a content sharing scheme may be implemented, in accordance with various embodiments described herein. The operations of processing flow 800 may be implemented in system configuration 10 including network 110, content server 120, and computing devices 130 and 140, as illustrated in FIG. 1. Processing flow 800 may include one or more operations, actions, or functions as illustrated by one or more blocks 810, 820, 830, 840, 850 and/or 860. Although illustrated as discrete blocks, various blocks may be divided into additional blocks, combined into fewer blocks, or eliminated, depending on the desired implementation. Processing may begin at block 810.

Block 810 (display message window) may refer to a messenger application hosted and operating on both computing devices 130 and 140 displaying a message window including a message input window and a message display window. Computing devices 130 and 140 may be configured to install a messenger application to share content information transmitted from one or more of content server 120. The messenger application may cause a processor to display a message input window and a message display window. The message input window may be located below, beside, or above the message display window. Processing may proceed from block 810 to block 820.

Block 820 (receive content search command and keyword) may refer to the messenger application receiving, through the message input window, a content search command and a content keyword by a user input to enter the content search command and the content keyword in the message input window. The content search command may include an identifier of one or more of content servers 120. After parsing the identifier, the messenger application may cause a processor to select a content server based on the parsed identifier. The identifiers may come in various forms and formats. The content search command may include an identifier of a field of search in addition to the identifier of content server 120.

Also, the content search command includes an identifier of a type of content subject matter to be searched. As a non-limiting example of the type of content subject matter, the type of content subject matter may include a text file, an image file, a video file, an audio file, a URL, etc. Processing may proceed from block 820 to block 830.

Block 830 (select content server based on command) may refer to the messenger application selecting a content server based on the content search command. For example, if a content search command includes identifier "A", the messenger application may cause a processor to receive the search command as an instruction to search the "Amazon®" server and select the "Amazon®" server. Processing may proceed from block 830 to block 840.

Block 840 (transmit keyword to content server) may refer to the messenger application transmitting the content keyword to the selected content server. For example, if the messenger application receives a content search command and a content keyword such as "content search command.content keyword" through the message input window, the messenger application may cause a processor to transmit, to the content server, a content keyword such as a desired product. That is, the messenger application may cause a processor to transmit, to the content server, a request of image of the desired product to be transmitted to computing devices 130 and 140. Processing may proceed from block 840 to block 850.

Block 850 (receive content information from content server) may refer to the messenger application receiving content information from the selected content server. For example, the messenger application may cause a processor to receive an image of the desired product uploaded and displayed in the "shopping" section in the content server website. Processing may proceed from block 850 to block 860.

Block 860 (display content information in message window) may refer to the messenger application displaying the received content information in the message display window. For example, after the messenger application receives an image of the desired product from the content server, then the messenger application may cause a processor to display the image of the desired product in the message display window.

Thus, FIG. 8 shows an example processing flow 800 of operations by which at least portions of a content sharing scheme may be implemented, in accordance with various embodiments described herein.

Figure 9:
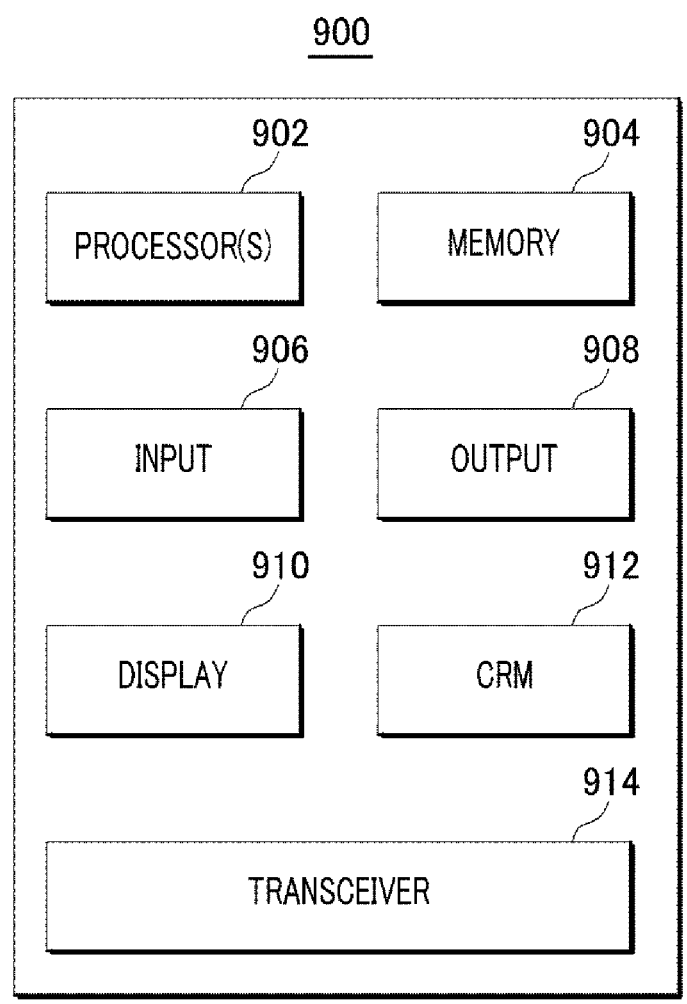
FIG. 9 shows an illustrative computing embodiment, in which any of the processes and sub-processes of a narrative generating scheme may be implemented as computer-readable instructions stored on a computer-readable medium, in accordance with various embodiments described herein.

FIG. 9 shows an illustrative computing embodiment, in which any of the processes and sub-processes of a content sharing scheme may be implemented as computer-readable instructions stored on a computer-readable medium, in accordance with various embodiments described herein. The computer-readable instructions may, for example, be executed by a processor of a device, as referenced herein, having a network element and/or any other device corresponding thereto, particularly as applicable to the applications and/or programs described above corresponding to the configuration 10 for transactional permissions.

In a very basic configuration, a computing device 900 may typically include, at least, one or more processors 902, a system memory 904, one or more input components 906, one or more output components 908, a display component 910, a computer-readable medium 912, and a transceiver 914.

Processor 902 may refer to, e.g., a microprocessor, a microcontroller, a digital signal processor, or any combination thereof.

Memory 904 may refer to, e.g., a volatile memory, non-volatile memory, or any combination thereof. Memory 904 may store, therein, an operating system, an application, and/or program data. That is, memory 904 may store executable instructions to implement any of the functions or operations described above and, therefore, memory 904 may be regarded as a computer-readable medium.

Input component 906 may refer to a built-in or communicatively coupled keyboard, touch screen, or telecommunication device. Alternatively, input component 906 may include a microphone that is configured, in cooperation with a voice-recognition program that may be stored in memory 904, to receive voice commands from a user of computing device 900. Further, input component 906, if not built-in to computing device 900, may be communicatively coupled thereto via short-range communication protocols including, but not limitation, radio frequency or Bluetooth.

Output component 908 may refer to a component or module, built-in or removable from computing device 900, that is configured to output commands and data to an external device.

Display component 910 may refer to, e.g., a solid state display that may have touch input capabilities. That is, display component 910 may include capabilities that may be shared with or replace those of input component 906.

Computer-readable medium 912 may refer to a separable machine readable medium that is configured to store one or more programs that embody any of the functions or operations described above. That is, computer-readable medium 912, which may be received into or otherwise connected to a drive component of computing device 900, may store executable instructions to implement any of the functions or operations described above. These instructions may be complimentary or otherwise independent of those stored by memory 904.

Transceiver 914 may refer to a network communication link for computing device 900, configured as a wired network or direct-wired connection. Alternatively, transceiver 914 may be configured as a wireless connection, e.g., radio frequency (RF), infrared, Bluetooth, and other wireless protocols.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

I claim:

1. A user computing device to execute an instant messaging (IM) application, the user computing device comprising:
a memory; and
a processing unit,
wherein the IM application is configured to cause the processing unit to:
display a message input window and a message display window on an interface of the IM application;
receive, through the message input window, from a user of the user computing device, a content search command and a content keyword, wherein the content search command includes an identifier of a type of content subject matter to be searched,
wherein the type of content subject matter to be searched is at least one of a text, an image file, a video file, an audio file, a URL, song lyrics, or a map;
identify, based on the content search command, the type of content subject matter to be searched;
select a content server among a plurality of content servers based on the identified type of content subject matter to be searched;

transmit the content keyword received from the user and a request for the content associated with the identified type of content subject matter to the selected content server;

receive content information from the selected content server, the content information including at least one search result of the requested content in accordance with the content search command and the content keyword; and display the received content information as a message from the user in the message display window.

2. The user computing device of claim 1, wherein the content search command further includes an identifier of the selected content server, and wherein the processing unit is further configured to: receive the content information from the content server by calling an application programming interface (API) associated with the identifier of the selected content server.

3. The user computing device of claim 1, wherein the content search command further includes at least one of a number of search results or a description of a sequence of the content information to be displayed in the message display window, and wherein the processing unit is further configured to: display the content information, based on the at least one of the number of search results and the description of the sequence of the content information.

4. The user computing device of claim 1, wherein the processing unit is further configured to:

receive, through the message input window, the content search command and the content keyword that are separated from each other by a preset separator, and parse the content search command and the content keyword in accordance with the preset separator.

5. The user computing device of claim 1, wherein the content search command further includes an identifier of a field of search comprises an alphanumeric identifier that indicates a section of at least one of web contents or mass media publications.

6. The user computing device of claim 1, wherein the identifier of the type of content subject matter includes an alphanumeric identifier that indicates the type of content subject matter is at least one of the text, the image file, the video file, the audio file, the URL, the song lyrics, or the map.

7. A non-transitory computer-readable storage medium having thereon computer-executable instructions that, in response to execution, cause a user device to perform operations, comprising:

displaying, by an instant messaging (IM) application hosted on the user device, from a user of the user device, a message input window and a message display window on an interface of the IM application;

receiving, by the IM application, through the message input window, a content search command and a content keyword, wherein the content search command includes an identifier of a type of content subject matter to be searched, wherein the type of content subject matter to be searched is at least one of a text, an image file, a video file, an audio file, a URL, song lyrics, or a map;

identifying, by the IM application and based on the content search command, the type of content subject matter to be searched;

selecting, by the IM application, a content server, based on the identified type of content subject matter to be searched;

transmitting, by the IM application, the content keyword received from the user and a request for the content associated with the identified type of content subject matter to the selected content server;

receiving, by the IM application, content information from the selected content server, the content information including at least one search result of the requested content in accordance with the content search command and the content keyword; and displaying, by the IM application, the received content information as a message from the user in the message display window.

8. The non-transitory computer-readable storage medium of claim 7, wherein the content search command further includes an identifier of the selected content server, and wherein the computer-readable storage medium comprises executable instructions to further receive the content information by calling an application programming interface (API) associated with the identifier of the content server.

9. The non-transitory computer-readable storage medium of claim 7, wherein the content search command further includes at least one of a number of search results or a description of a sequence of the at least one content information to be displayed in the message display window, and wherein the non-transitory computer-readable storage medium comprises executable instructions to: display the content information, based on the at least one of the number of search results or the description of the sequence of the content information.

10. The non-transitory computer-readable storage medium of claim 7, wherein the non-transitory computer-readable storage medium comprises executable instructions to:

receive, through the message input window, the content search command and the content keyword that are separated from each other by a preset separator, and parse the content search command and the content keyword in accordance with the preset separator.

11. The non-transitory computer-readable storage medium of claim 7, wherein the content search command further includes an identifier of a field of search, wherein the identifier of the field of search includes an alphanumeric identifier that indicates a section of at least one of web contents or mass media publications, and wherein the identifier of the type of content subject matter includes an alphanumeric identifier that indicates the type of content subject matter is at least one of the text, the image file, the video file, the audio file, the URL, the song lyrics, or the map.

* * * * *